(12) United States Patent
Hamada et al.

(10) Patent No.: US 7,908,639 B2
(45) Date of Patent: Mar. 15, 2011

(54) INFORMATION TRANSFER APPARATUS AND METHOD, INFORMATION PROCESSING APPARATUS AND METHOD, AND INFORMATION PROCESSING SYSTEM

(75) Inventors: Ichiro Hamada, Kanagawa (JP); Yoko Yamasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1496 days.

(21) Appl. No.: 10/333,185

(22) PCT Filed: May 14, 2002

(86) PCT No.: PCT/JP02/04637
§ 371 (c)(1),
(2), (4) Date: Jan. 16, 2003

(87) PCT Pub. No.: WO02/096101
PCT Pub. Date: Nov. 28, 2002

(65) Prior Publication Data
US 2003/0169368 A1    Sep. 11, 2003

(30) Foreign Application Priority Data

May 17, 2001    (JP) .................................. 2001-147523

(51) Int. Cl.
*H04N 7/16*    (2006.01)
(52) U.S. Cl. ...................................................... 725/146
(58) Field of Classification Search .................... 725/146
See application file for complete search history.

(56) References Cited

U.S. PATENT DOCUMENTS

| | | | | |
|---|---|---|---|---|
| 5,648,960 | A * | 7/1997 | Sakazaki et al. | 370/498 |
| 5,740,306 | A * | 4/1998 | Shinohara et al. | 386/67 |
| 5,864,358 | A * | 1/1999 | Suzuki et al. | 725/142 |
| 5,864,682 | A * | 1/1999 | Porter et al. | 709/247 |
| 5,999,515 | A * | 12/1999 | Ohashi | 370/230.1 |
| 6,128,316 | A * | 10/2000 | Takeda et al. | 370/468 |
| 6,151,078 | A * | 11/2000 | Yoneda et al. | 348/558 |
| 6,351,474 | B1* | 2/2002 | Robinett et al. | 370/486 |
| 6,463,059 | B1* | 10/2002 | Movshovich et al. | 370/389 |
| 6,487,720 | B1* | 11/2002 | Ohishi | 725/31 |
| 6,754,347 | B1* | 6/2004 | Hamada | 380/216 |
| 6,754,437 | B1* | 6/2004 | Hirai et al. | 386/83 |
| 6,956,869 | B1* | 10/2005 | Kato | 370/468 |
| 7,103,069 | B2* | 9/2006 | Miyagawa et al. | 370/473 |
| 7,103,263 | B1* | 9/2006 | Murayama et al. | 386/83 |
| 7,184,652 | B2* | 2/2007 | Sugimoto et al. | 386/98 |
| 7,193,999 | B1* | 3/2007 | Takatori et al. | 370/394 |
| 2002/0015400 | A1* | 2/2002 | Morinaga et al. | 370/345 |
| 2002/0090087 | A1* | 7/2002 | Tamura et al. | 380/210 |

FOREIGN PATENT DOCUMENTS

| | | |
|---|---|---|
| JP | 11-239186 | 8/1999 |
| JP | 2001-8211 | 1/2001 |

* cited by examiner

*Primary Examiner* — Brian T Pendleton
*Assistant Examiner* — Jonathan Lewis
(74) *Attorney, Agent, or Firm* — Frommer, Lawrence & Haug LLP; William S. Frommer; Ellen Marcie Emas

(57) ABSTRACT

When a transport stream is transmitted between each unit connected through an interface, if any data which is not permitted to be transmitted on a partial transport stream is transmitted, information of this section is transmitted as a private section or a user private. As a result, information of a section of an EIT can be transmitted from for example a digital satellite broadcast tuner to a personal computer and an original program schedule list can be created on the personal computer.

23 Claims, 12 Drawing Sheets

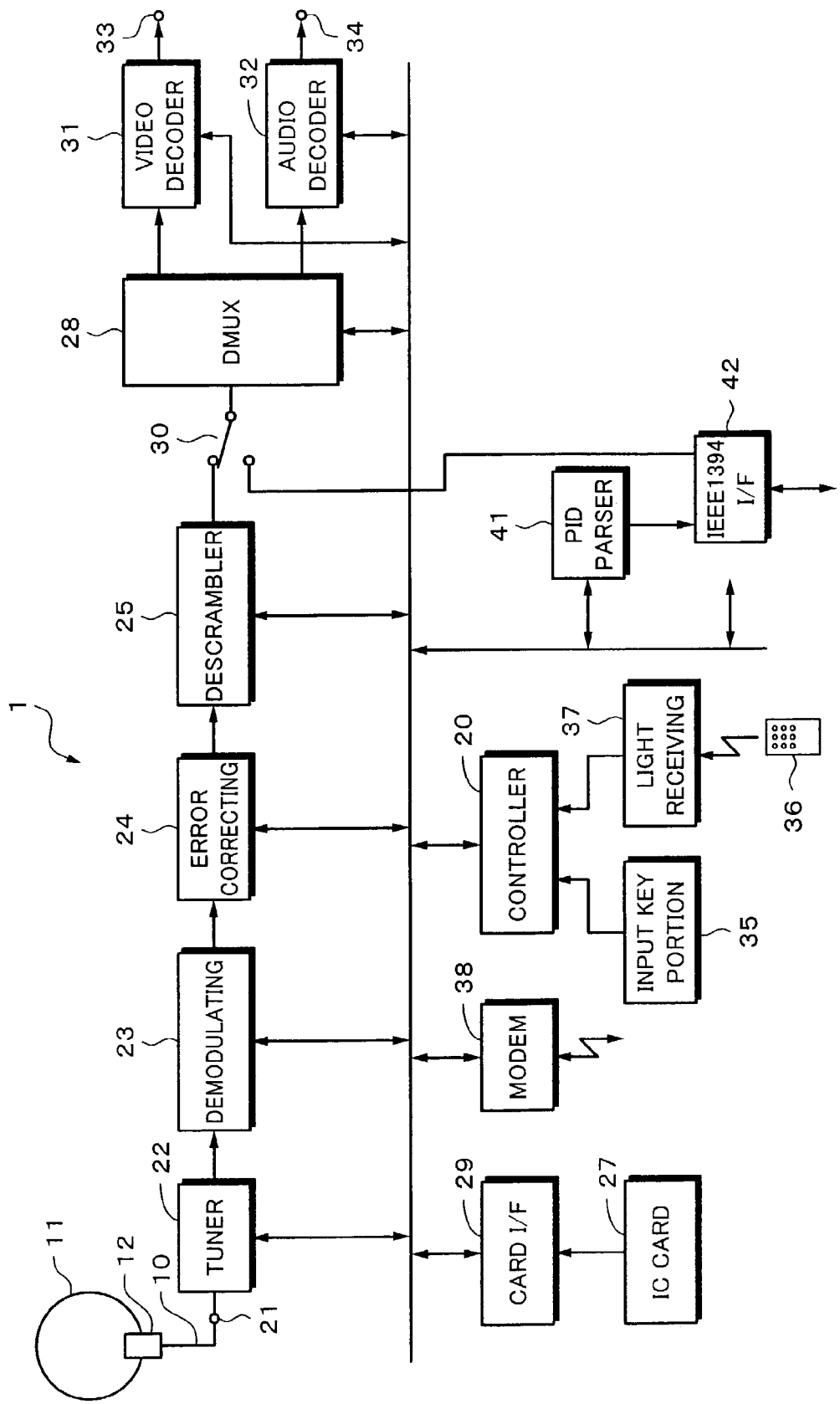

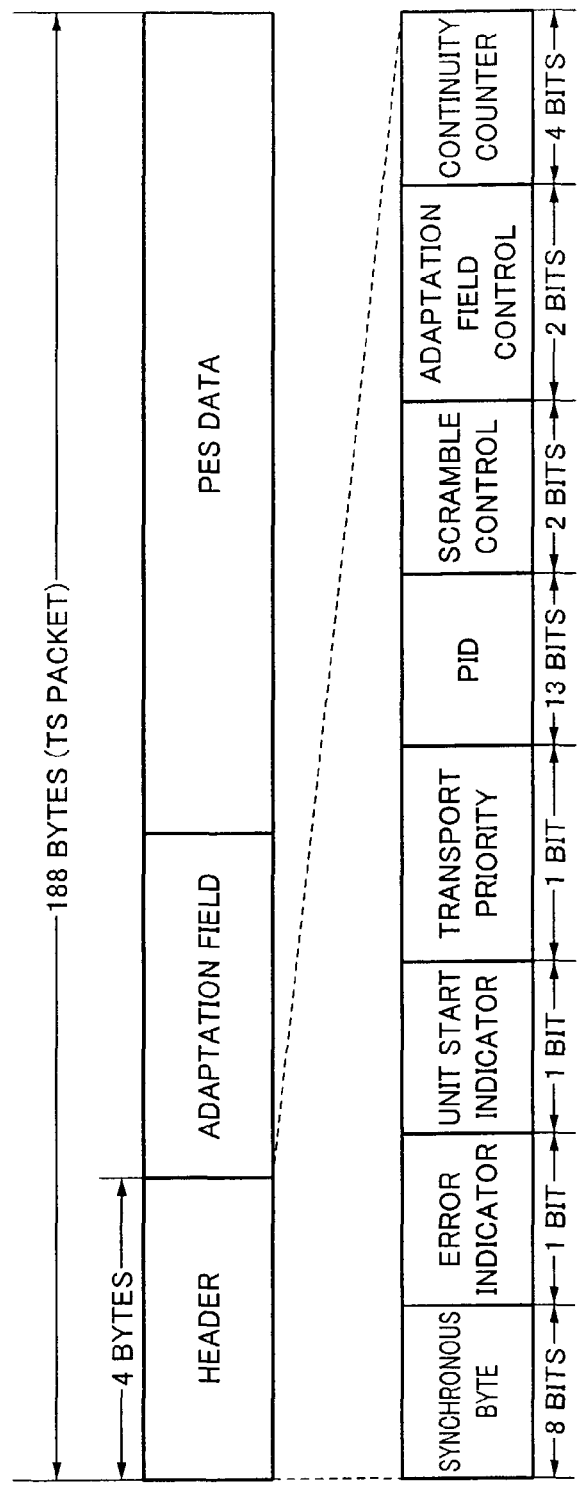

Fig. 8

| SYNTAX | NUMBER OF BITS | MNEMONIC |
| --- | --- | --- |
| TS_program_map_section ( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for( i = 0 ; i < N ; i ++ ){ | | |
|         descriptor ( ) | | |
|     } | | |
|     for( i = 0 ; i < N1 ; i ++ ){ | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for( i = 0 ; i < N2 ; i ++ ){ | | |
|             descriptor ( ) | | |
|         } | | |
|     } | | |
|     CRC_32 | 32 | rpchof |
| } | | |

Fig. 9

| VALUE | DESCRIPTION |
|---|---|
| 0x00 | ITU-T | ISO/IEC resereved |
| 0x01 | ISO/IEC 11172-2 Video |
| 0x02 | ITU-T Rec.H.262 | ISO/IEC 13818-2 Video or ISO/IEC 11172-2 constrained parameter video stream |
| 0x03 | ISO/IEC 11172-3 Audio |
| 0x04 | ISO/IEC 13818-3 Audio |
| 0x05 | ITU-T Rec. H.222.0 | ISO/IEC 13818-1 private_sections |
| 0x06 | ITU-T Rec. H.222.0 | ISO/IEC 13818-1 PES packets containing private data |
| 0x07 | ISO/IEC 13522 MHEG |
| 0x08 | Annex A-DSM CC |
| 0x09 | ITU-T Rec.H.222.1 |
| 0x0A | ISO/IEC 13818-6 type A |
| 0x0B | ISO/IEC 13818-6 type B |
| 0x0C | ISO/IEC 13818-6 type C |
| 0x0D | ISO/IEC 13818-6 type D |
| 0x0E | ISO/IEC 13818-1 auxiliary |
| 0x0F – 0x7F | ITU-T Rec. H.222.0 | ISO/IEC 13818-1 reserved |
| 0x80 – 0xFF | User private |

Fig. 10

REGISTRATION DESCRIPTOR

| SYNTAX | NUMBER OF BITS | |
|---|---|---|
| registration_descriptor ( ) { | | |
| descriptor_tag | 8 | |
| descriptor_length | 8 | |
| format_identifier | 32 | FOUR LETTER ASCII CODE REPRESENTING FORMAT EXAMPLE) "BSEI" (EIT OF BE) |
| for ( i = 0 ; i < N ; i ++ ) { | | |
| additional_identification_info | 8 | |
| } | | |
| } | | |

INFORMATION TRANSFER APPARATUS AND METHOD, INFORMATION PROCESSING APPARATUS AND METHOD, AND INFORMATION PROCESSING SYSTEM

TECHNICAL FIELD

The present invention relates to an information transmitting apparatus, a method thereof, an information processing apparatus, a method thereof, and an information processing system suitably used for a satellite broadcast tuner for receiving a signal based on the MPEG (Moving Picture Coding Experts Group) 2-TS (Transport Stream) for a digital BS (Broadcast Satellite) broadcast, a digital CS (Communication Satellite) broadcast, or the like. In particular, the present invention relates to those for removing unnecessary TS packets from a demodulated transport stream and transferring the resultant stream as a partial transport stream through an interface.

BACKGROUND ART

In Japan, digital satellite broadcasts have been performed corresponding to the standards of the ARIB (Association of Radio Industrial and Businesses). The standards of the ARIB are based on the DVB (Digital Video Broadcasting) standards used in Europe. The DVB standards uses the MPEG (Moving Picture Coding Experts Group) 2-TS (Transport Stream) system for broadcasting video and audio.

The MPEG2 system prescribes a system for multiplexing individual streams of encoded video, audio, and additional data and synchronously reproducing them. The MPEG2 system is categorized as two systems which are MPEG2-PS (Program Stream) and MPEG2-TS.

It has been supposed that the MPEG2-PS is used for transmitting and storing data in an error free environment. As a result, the MPEG2-PS allows the redundancy of data to be decreased. Thus, the MPEG2-PS has been used for digital stream media such as DVDs (Digital Versatile Discs), which use strong error correction codes.

In contrast, it has been supposed that the MPEG2-TS is used for transmitting and storing data in broadcasts and communication networks which are subject to errors. In the MPEG2-TS, since a plurality of programs can be contained in one stream, the MPEG2-TS has been used for digital satellite broadcasts and so forth.

In the MPEG2-TS, one transport stream is composed of a plurality of TS packets each of which has a fixed length of 188 bytes. The length of each TS packet of 188 bytes is decided in consideration of the integrity with the length of each ATM (Asynchronous Transfer Mode) cell.

One TS packet is composed of a packet header having a fixed length of four bytes, an adaptation field having a variable length, and a payload. In the packet header, a PID (Packet Identifier) and various flags are defined. The PID identifies the type of the TS packet.

A PES (Packetized Elementary Stream) packet containing discrete streams of video and audio is divided into a plurality of TS packets having the same PID number and the divided TS packets are transmitted. Video is encoded corresponding to for example the MPEG2 system. Audio of for example BS (Broadcast Satellite) digital is encoded corresponding to the MPEG2-AAC (MPEG2 Advanced Audio Coding) system.

As with packets for video and audio, a PES packet containing a subtitle or the like is divided into a plurality of TS packets and the divided TS packets are transmitted.

In addition, a transport stream contains packets of information described in tables of sections of PSI (Program Specific Information) and SI (Service Information). The PSI is information necessary for a system to select and receive a desired broadcast channel. The PSI contains a PAT (Program Association Table), a PMT (Program Map Table), an NIT (Network Information Table), a CAT (Condition Access Table), and so forth. The PAT describes a PID of the PMT corresponding to the program table and so forth. The PMT describes PIDs of video, audio, additional data, and a PCR (Program Clock Reference) contained in the corresponding program. The NIT describes the carrier frequency at which the objective program is being transmitted. The CAT describes the identification of the restricted receiving system and information with respect to discrete information such as contract information. The SI is a section used for services of the broadcast provider.

As satellite broadcasts based on the standards of the ARIB, digital CS (Communication Satellite) broadcasts and digital BS (Broadcast Satellite) broadcasts have been already started. In the digital BS broadcasts, besides conventional SDTV (Standard Definition Television) broadcasts, HDTV (High Definition Television) broadcasts have been performed. Digital satellite broadcast tuners which receive such digital satellite broadcasts have been developed.

Such a digital satellite broadcast tuner is provided with an IEEE (Institute of Electrical and Electronics Engineers) 1394 interface with which an AV (Audio Visual) system can be structured by combining a digital VCR (Video Cassette Recorder) and a personal computer. The IEEE 1394 provides an isochronous transfer and an asynchronous transfer. Using the isochronous transfer, video and audio data can be transferred at high speed. Using the asynchronous transfer, basic commands for mode control, program tuning, and so forth can be transferred.

When a transport stream received by such a digital satellite broadcast tuner is transferred to a digital VCR through for example an IEEE 1394 interface and recorded by the digital VCR, if all the received transport stream is transferred to the digital VCR and recorded thereby, TS packets which do not directly relate to the program are also recorded. As a result, the record capacity is unnecessarily wasted. In addition, a problem of the integrity of information takes place.

For example, as was described above, a transport stream contains a TS packet of the PSI and IS. In the PSI, the section of the NIT describes the frequency of the stream of the desired program in a plurality of streams of a plurality of carrier frequencies. In other words, the section of the NIT describes information about the overall network. Thus, although the information of the NIT is information of a plurality of streams of the overall network, information of one stream transmitted with one carrier is recorded by the VCR. Thus, when a TS packet of the section of the NIT is recorded by the VCR, the integrity of information cannot be kept.

The section of the EIT (Event Information Table) of the SI describes a program broadcast schedule. The information of the section of the EIT is used for an EPG (Electronic Program Guide) and timer recording. When a packet of the section of the EIT is directly recorded by the VCR, the integrity of the broadcast time of the EIT and the real time cannot be kept.

In such a manner, when a TS packet of information of the section such as the NIT describing the overall network and a TS packet of information of the section such as the EIT containing future time information are recorded, there is a possibility of which the integrity of information is not kept.

Thus, when a conventional digital satellite broadcast tuner outputs a stream through for example an IEEE 1394 interface, a partial transport stream is output.

From a partial transport stream, TS packets of the sections of such as the NIT and the EIT, which causes a problem about the integrity of information to arise, are removed. As a TS packet of the PSI, only information of the sections of the PAT and the PMT are output. As a TS packet of the SI, only information of the section of the SIT (Selection Information Table) composed of information of only a partial transport stream is output. In addition, when information is broken (for example, a channel is changed or the power is turned off), a packet of the section of the DIT (Discontinuity Information Table) is transmitted so that a problem about the integrity of information does not arise.

Details about a partial transport stream are described in "DVB ETS 300 468 Specification for Service Information (SI) in DVB systems," ARIB-STD B1/B2 and ARIB TR-B15.

However, if a partial transport stream is output from the IEEE 1394 interface, information which is not permitted to be transmitted on a partial transport stream cannot be used.

For example, with the IEEE 1394 interface, a digital satellite broadcast tuner can be connected to not only a digital VCR, but various types of units such as a personal computer and a home server. For example, when a digital satellite broadcast tuner and a personal computer are connected with the IEEE 1394 interface, the received transport stream can be recorded to the HDD (Hard Disk Drive) of the personal computer and the pictures can be processed and edited.

In addition, if not only information of video and audio, but information of the sections of the PSI (Program Specification Information) and the SI (Service Information) can be transmitted from the digital satellite broadcast tuner to the personal computer, the information of the sections can be processed and used.

For example, the EIT (Event Information Table) describes information of a broadcast program schedule. The information of the broadcast program schedule is used for the EPG (Electronic Program Guide) and the timer recoding. If the information of the EIT can be transferred to the personal computer and used, a program schedule list can be created on the personal computer.

When a program schedule list has been created on the personal computer, information about programs, actors, and actresses can be easily searched on the Internet. In addition, on the personal computer, a user's original EPG screen which is different from an EPG screen displayed on the television can be created.

When information of the section of the EIT is transferred to the personal computer, the information can be used thereon and an original EPG can be created thereon.

However, as was described above, a stream which is output from a conventional digital satellite broadcast tuner through the IEEE 1394 interface is a partial transport stream. Information of the section of the EIT is not permitted to be transmitted on the partial transport stream.

Likewise, a transport stream which is broadcast contains a section of an SDT (Service Description Table) which describes information about a channel organization such as channel numbers, channel names, and a broadcast provider name. It can be supposed that the SDT is transmitted to a personal computer and the information thereof is used on the personal computer. However, the section of the SDT is not permitted to be transmitted on the partial transport stream.

Thus, an object of the present invention is to provide an information transmitting apparatus, a method thereof, an information processing apparatus, a method thereof, and an information processing system that allow information of a section which is not permitted to be transferred on a partial transport stream to be transferred to another unit when unnecessary TS packets are removed from a demodulated transport stream, information of a necessary section is inserted thereinto, and the resultant stream is output as a partial transport stream from an interface.

DISCLOSURE OF THE INVENTION

The present invention is an information transmitting apparatus, comprising: a packet extracting means for extracting a packet which is permitted to be transmitted on a partial transport stream from a transport stream; an interface for transmitting the partial transport stream which is output through the packet extracting means to another unit; and a means for outputting a packet which is not permitted to be transmitted on the partial transport stream as a packet of a private section or a packet of a user private when the packet is output through the interface.

The present invention is an information transmitting method, comprising the steps of: extracting a packet which is permitted to be transmitted on a partial transport stream from a transport stream and outputting the extracted packet to an interface; and forming a packet which is not permitted to be transmitted on the partial transport stream as a packet of a private section or a packet of a user private when the packet is output through the interface.

The present invention is an information processing apparatus, comprising: an interface for receiving a partial transport stream transmitted from another unit; a packet separating means for separating packets from the partial transport stream transmitted through the interface; and a analyzing means for analyzing the content of a PMT of the partial transport stream transmitted through the interface, information of each element of a transport stream being described in the PMT, and interpreting a packet of a private section as a packet which is not permitted to be transmitted on the partial transport stream when the analyzed result represents that the partial transport stream contains the private section.

The present invention is an information processing method, comprising the steps of: receiving a partial transport stream transmitted from another unit through an interface; separating packets from the partial transport stream transmitted through the interface; and analyzing the content of a PMT of the partial transport stream transmitted through the interface, information of each element of a transport stream being described in the PMT, and interpreting a packet of a private section as a packet which is not permitted to be transmitted on the partial transport stream when the analyzed result represents that the partial transport stream contains the private section or a user private.

The present invention is an information processing system, comprising: an information transmitting apparatus for extracting a packet which is permitted to be transmitted on a partial transport stream from a transport stream and outputting the extracted packet through an interface; and an information processing apparatus for receiving a partial transport stream transmitted through the interface, separating packets from the partial transport stream, and processing the packets, wherein when a packet which is not permitted to be transmitted on the partial transport stream is transmitted from the information transmitting apparatus to the information processing apparatus through the interface, the information transmitting apparatus is configured to transmit a packet which is not permitted to be transmitted on the partial transport stream as a packet of a private section or a packet of a user private.

When a transport stream is transmitted between each unit connected through an interface, unnecessary TS packets are removed from the transport stream and a necessary section is inserted thereinto. The resultant stream is transmitted as a partial transport stream. If information of a section of for example an EIT or an SDT which is not permitted to be transmitted on a partial transport stream is transmitted between each unit through the interface, information of this section is transmitted as a private section or a user private. As a result, information of the section of the EIT can be transmitted from for example a digital satellite broadcast tuner to a personal computer and an original program schedule list can be created on the personal computer.

BRIEF DESCRIPTION OF DRAWINGS

FIG. 2 is a block diagram showing an example of a satellite broadcast tuner according to the present invention;

FIGS. 3A and 3B are schematic diagrams for explaining a transport stream;

FIG. 8 is a schematic diagram for explaining a PMT;

FIG. 9 is a schematic diagram for explaining the PMT;

FIG. 10 is a schematic diagram for explaining a registration descriptor;

BEST MODES FOR CARRYING OUT THE INVENTION

Figure 1:
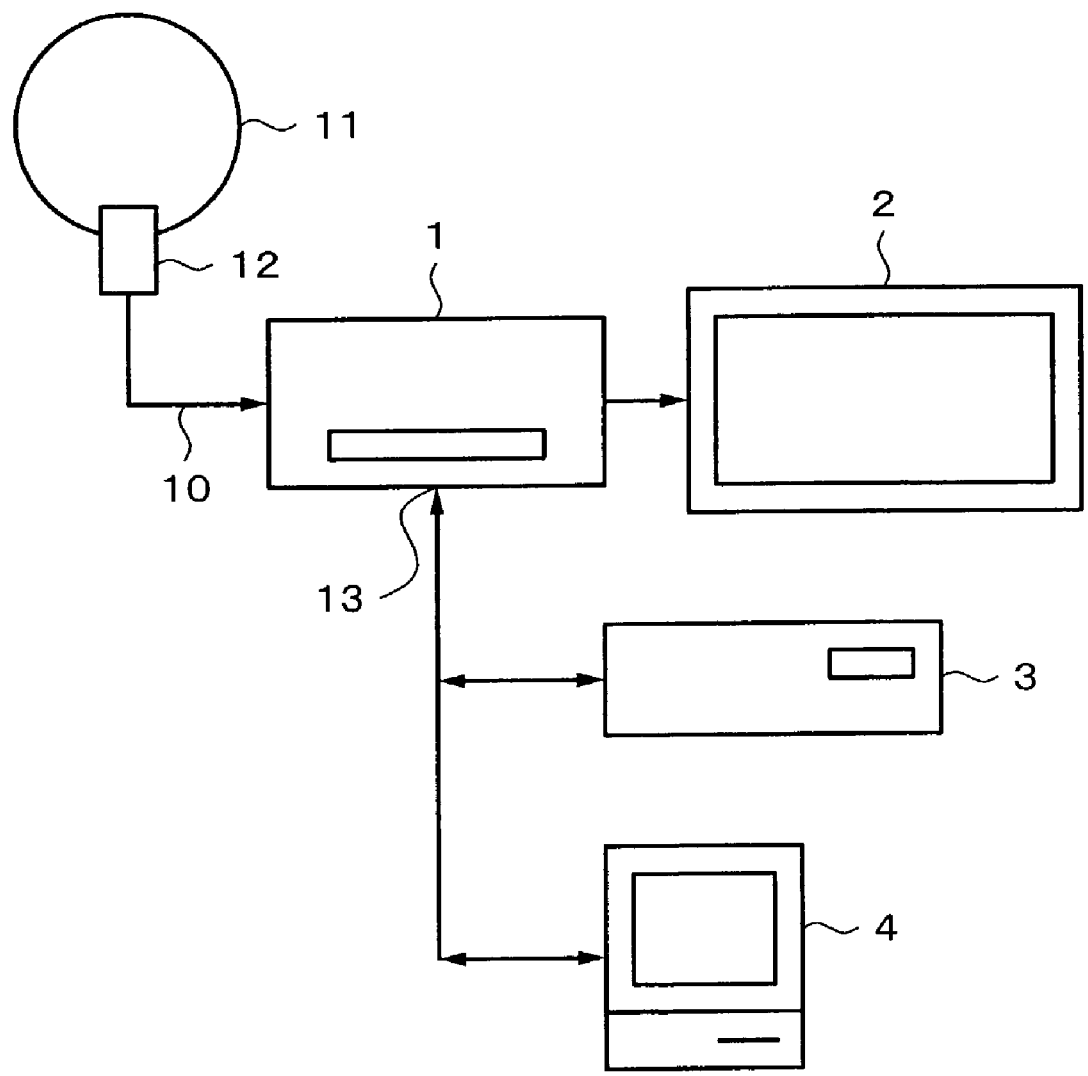
FIG. 1 is a block diagram showing an example of a satellite broadcast receiving system according to the present invention.

Next, with reference to the accompanying drawings, an embodiment of the present invention will be described. FIG. 1 shows an example of a BS digital satellite broadcast receiving system according to the present invention.

In FIG. 1, a radio wave transmitted from a BS digital satellite is received by a parabola antenna 11. A low noise converter 12 disposed on the parabola antenna 11 converts the received radio wave into an intermediate frequency signal. The intermediate frequency signal is supplied to a BS digital satellite broadcast tuner 1 through a cable 10. The BS digital satellite broadcast tuner 1 demodulates the received signal into a transport stream. The transport stream is decoded into a video signal and an audio signal.

The video signal and the audio signal that have been decoded from the transport stream by the BS digital satellite broadcast tuner 1 are supplied to a television receiver 2. The television receiver 2 reproduces the video signal and the audio signal and displays a picture corresponding to the reproduced video signal and outputs a sound corresponding to the reproduced audio signal.

The BS digital broadcasts support both SDTV broadcasts and HDTV broadcasts.

In other words, the BS digital broadcasts support a 1080i picture format (number of effective pixels=1920×1080; aspect ratio=16:9; interlace scanning), a 480p picture format (number of effective pixels=720×480; aspect ratio=16:9; progressive scanning), a 480i picture format (number of effective pixels=720×480; aspect ratio=16:9 or 4:3; interlace scanning), and a 720p picture format (number of effective pixels=1280×720; aspect ratio=16:9; progressive scanning). The 480i picture format is referred to as SDTV, whereas the 1080i picture format is referred to as HDTV.

It is preferred that the television receiver 2 should support those formats and be provided with a D terminal.

A D terminal can handle a component video signal composed of a luminance signal Y and color difference signals Pb and Pr. Depending on the broadcast formats, a D terminal has five types which are D1 to D5. In addition, a D terminal contains a signal for identifying a picture format. When the television receiver 2 is provided with a D terminal, by connecting the BS digital satellite broadcast tuner 1 and the television receiver 2 with the D terminal, the television receiver 2 can handle those types of picture formats.

The BS digital satellite broadcast tuner 1 is provided with an IEEE 1394 interface 13. The IEEE 1394 interface 13 can have up to 63 nodes. A digital VCR 3 and a personal computer 4 can be connected to the IEEE 1394 interface 13. The IEEE 1394 can perform an isochronous transfer and an asynchronous transfer. The isochronous transfer allows video data and audio data to be transferred at high speed. The asynchronous transfer allows basic commands such as a mode control and a channel tuning to be transferred.

The transport stream demodulated by the BS digital satellite broadcast tuner 1 can be recorded by the digital VCR 3 through the IEEE 1394 interface 13. When the transport stream demodulated by the BS digital satellite broadcast tuner 1 is recorded by the digital VCR 3, the transport stream which has been output from the BS digital satellite broadcast tuner 1 is transferred to the digital VCR 3 through the IEEE 1394 interface 13. Thereafter, the digital VCR 3 is set to a record mode so that the transport stream which has been output from the BS digital satellite broadcast tuner 1 is recorded by the digital VCR 3.

The asynchronous transfer of the IEEE 1394 interface allows a command to be transferred. Thus, when the IEEE 1394 interface 13 is used, a command can be sent from the BS digital satellite broadcast tuner 1 to the digital VCR 3 so that the digital VCR 3 is set to the record mode and the transport stream which has been output from the BS digital satellite broadcast tuner 1 is recorded by the digital VCR 3.

When a transport stream which is recorded in the digital VCR 3 is reproduced, the digital VCR 3 is set to a reproduction mode. In the reproduction mode, a transport stream is reproduced from the digital VCR 3 and the reproduced transport stream is output. In this case, when a command is sent from the BS digital satellite broadcast tuner 1 to the digital VCR 3 through the IEEE 1394 interface 13, the digital VCR 3 can be set to the reproduction mode.

The transport stream which has been reproduced from the digital VCR 3 is supplied to the BS digital satellite broadcast tuner 1 through the IEEE 1394 interface 13. The BS digital satellite broadcast tuner 1 decodes the transport stream into a video signal and an audio signal. The video signal and the audio signal which have been decoded from the transport stream by the BS digital satellite broadcast tuner 1 is supplied to the television receiver 2. The television receiver 2 reproduces the video signal and the audio signal and displays a picture corresponding to the reproduced video signal and outputs a sound corresponding to the reproduced audio signal.

When the BS digital satellite broadcast tuner 1 and the digital VCR 3 are connected with the IEEE 1394 interface 13 and the transport stream demodulated by the BS digital satellite broadcast tuner 1 is transferred to the digital VCR 3 and the transport stream is recorded by the digital VCR 3, a received program can be recorded.

Likewise, a transport stream demodulated by the BS digital satellite broadcast tuner 1 can be transferred to the personal computer 4 through the IEEE 1394 interface 13. When a transport stream demodulated by the BS digital satellite broadcast tuner 1 is recorded to the HDD of the personal computer 4, the transport stream which has been output from the BS digital satellite broadcast tuner 1 is transferred to the personal computer 4 through the IEEE 1394 interface 13. In this case, when a command is sent from the personal computer 4 to the BS digital satellite broadcast tuner 1 through the IEEE 1394 interface 13, the transport stream which has been output from the BS digital satellite broadcast tuner 1 can be transferred to the personal computer 4. The transport stream which has been transferred from the BS digital satellite broadcast tuner 1 to the personal computer 4 is recorded to the HDD of the personal computer 4. The transport stream recorded on the HDD of the personal computer 4 is decoded on the personal computer 4 so that the user can enjoy a program and edit video data thereof.

When the transport stream which has been output from the IEEE 1394 interface 13 of the BS digital satellite broadcast tuner 1 is transferred to the digital VCR 3 and the transferred transport stream is recorded by the digital VCR 3, if all the transport stream which has been demodulated by the BS digital satellite broadcast tuner 1 is transferred to the digital VCR 3 and recorded thereby, the record capacity may be unnecessarily wasted and a problem of the integrity of information may arise. Thus, the transport stream which is output from the IEEE 1394 interface 13 of the BS digital satellite broadcast tuner 1 is a partial transport stream of which TS packets which do not directly relate to the program are removed from the transport stream and a necessary section is inserted into the transport stream.

However, when a stream which is output from the IEEE 1394 interface 13 is a partial transport stream, information which is not permitted to be transmitted on the partial transport stream cannot be used.

For example, if information of the section of the EIT can be sent from the BS digital satellite broadcast tuner 1 to the personal computer 4, an original program schedule list can be easily created on the personal computer. In addition, information about programs, actors, and actresses can be easily searched on the Internet. However, information of the section of the EIT is not permitted to be transmitted on the partial transport stream.

Thus, according to the embodiment of the present invention, information of an section which is not permitted to be transmitted on a partial transport stream is transmitted as information of a private section. Thus, information of the section of the EIT can be sent from the BS digital satellite broadcast tuner 1 to the personal computer 4. An original program schedule list can be created on the personal computer 4.

FIG. 2 shows the structure of the BS digital satellite broadcast tuner 1. In FIG. 2, a radio wave of a digital satellite broadcast transmitted as a radio wave of for example 12 GHz band is received by the parabola antenna 11. The low noise converter 12 disposed on the parabola antenna 11 converts the received radio wave into an intermediate frequency signal of for example 1 GHz band. An output signal of the low noise converter 12 is supplied to an antenna terminal 21 of the BS digital satellite broadcast tuner 1 through the cable 10.

An output signal of the antenna terminal 21 is supplied to a tuner circuit 22. The tuner circuit 22 selects a signal having a desired carrier frequency from the received signal corresponding to a frequency setting control signal received from a controller 20.

An output signal of the tuner circuit 22 is supplied to a demodulating circuit 23. The demodulating circuit 23 can perform a demodulating process corresponding to BPSK (Binary Phase Shift Keying), QPSK (Quadrature Phase Shift Keying), or TC-8PSK (Trellis 8-Phase PSK).

In other words, in the BS digital satellite broadcasts, a hierarchical transmission is performed using the BPSK, the QPSK, and the TC-IPSK. In the TC-8PSK modulation, although the information amount per symbol increases, if there is an attenuation due to rain, the error rate deteriorates. In contrast, in the BPSK and QPSK modulations, although the information amount per symbol is small, even if there is an attenuation due to rain, the error rate does not deteriorate much.

On the transmission side, one TS packet is assigned to one slot. Each TS packet is mapped to a frame composed of 48 slots. A modulation system and an encoding system can be designated to each slot. The modulation system and coding rate designated to each slot are transmitted with a TMCC (Transmission and Multiplexing Configuration Control) signal. In the unit of eight frames, one super frame is composed. An interleaving is performed at each slot position.

An output signal of the demodulating circuit 23 is supplied to an error correcting circuit 24. The error correcting circuit 24 performs an error correcting process. As an outer code and an inner code of the error correction code encoding system, Reed-Solomon code (204, 188) and trellis code or convolution code are used, respectively.

An output signal of the error correcting circuit 24 is supplied to a descrambler 25. The descrambler 25 performs a CAS (Condition Access System) control.

In other words, when a restricting reception is performed, a transport stream is encrypted. Personal information is stored in an IC card 27. The IC card 27 is attached to the BS digital satellite broadcast tuner 1 through a card interface 29.

Information of sections of received ECM (Entitlement Control Message) and EMM (Entitlement Management Message) is supplied to the descrambler 25. In addition, descrambling key data stored in the IC card 27 is supplied to the descrambler 25. When a restricting reception is performed, the descrambler 25 descrambles the transport stream using the received ECM and EMM and information stored in the IC card 27.

In addition, a modem 38 is disposed. Charging information is transmitted to a program broadcasting center through the modem 38.

The descrambled transport stream is sent to a demultiplexer 28 through a switch circuit 30.

The demultiplexer 28 separates a stream containing a desired packet from the transport stream which has been output from the descrambler 25 corresponding to a command received from the controller 20. A header portion of the packet describes a packet identifier (PID). The demultiplexer 28 separates a video packet, an audio packet, a data packet, and a PSI and SI packet of the desired program from the transport stream corresponding to the PID.

A video packet of the desired program is sent to a video decoder 31. An audio packet is sent to an audio decoder 32. A data packet and a PSI and SI packet are sent to the controller 20.

The video decoder 31 receives video packets from the demultiplexer 28, performs a decoding process for the video packets corresponding to the MPEG2 system, and reproduces a video signal from the video packets. The reproduced video signal is output from an output terminal 33.

The audio decoder 32 receives audio packets from the demultiplexer 28, performs a decoding process for the audio packets corresponding to the MPEG2-AAC system, and forms an audio signal with the audio packets. The reproduced audio signal is output from an output terminal 34.

Commands for operating the BS digital satellite broadcast tuner 1 are input from not only an input key portion 35, but a remote controller 36. An infrared ray command signal radiated from the remote controller 36 is received by a light receiving portion 37. The infrared ray command signal is sent from the light receiving portion 37 to the controller 20.

For example, information of the section of the EIT is not permitted to be transmitted on a partial transport stream. When the information of such a section is needed to be transmitted, the PID information of the section is set to a PID parser 41.

The PID parser 41 passes only TS packets which are permitted to be transmitted on a partial transport stream and discards the other TS packets.

In other words, the PID parser 41 passes only packets of the sections of the PAT and the PMT and PES packets of audio, video, and data which are permitted to be transmitted on a partial transport stream and discards the other packets. As will be described later, when packets of the sections of the EIT and SDT are output as packets of a private section, the PID parser 41 is set so that it also passes packets of information of a private section.

A partial transport stream of which the SIT and the DIT formed by the controller 20 have been inserted into the stream which has been output from the PID parser 41 is output. The partial transport stream is supplied to an IEEE 1394 interface 42. The partial transport stream is transferred to a unit connected to the IEEE 1394 interface 42.

In contrast, a transport stream transferred from another unit connected to the IEEE 1394 interface 42 is supplied to the demultiplexer 28 through the IEEE 1394 interface 42 and the switch circuit 30.

The demultiplexer 28 separates a video packet, an audio packet, a data packet, and a PSI and SI packet of a desired program from the transport stream corresponding to the PID.

A video packet of the desired program is sent to the video decoder 31. An audio packet is sent to the audio decoder 32. A data packet and a PSI and SI packet are sent to the controller 20.

The video decoder 31 reproduces a video signal from video packets which have been output from the demultiplexer 28. A reproduced video signal is output from the output terminal 33. The audio decoder 32 reproduces an audio signal from audio packets which have been output from the demultiplexer 28. A reproduced audio signal is output from the output terminal 34.

In such a manner, according to the embodiment of the present invention, as with information of the sections of the EIT and SDT, when information of the sections which is not permitted to be transmitted on a partial transport stream is transmitted, the information of the sections is transmitted as information of a private section. Next, this operation will be described.

In the MPEG2-TS system, as shown in FIG. 3, TS packets each of which is composed of 188 bytes are used. As shown in FIG. 3A, each TS packet is composed of a header of four bytes and a payload of 184 bytes.

As shown in FIG. 3B, a synchronous byte (sync_byte) of eight bits is disposed at the beginning of the packet. The synchronous byte is followed by an error indicator (transport_error_indicator) of one bit which represents whether or not the packet contains an error, a unit start indicator (payload_unit_start_indicator) of one bit which represents that a new PES packet starts with the payload of the transport packet, a transport priority (transport_priority) of one bit which represents the importance level of the packet, a PID (packet_ID) of 13 bits which identifies a discrete packet, a scramble control (transport_scramble_control) of two bites which represents whether or not the payload has been scrambled, an adaptation field control (adaptation_field_control) of two bits which represents whether an adaptation field is present or absent and whether a payload is present or absent, and a continuity counter (continuity_counter) of four bits which detects whether or not part of the packet with the PID has been discarded corresponding to the continuity of the reception count.

Figure 4A:
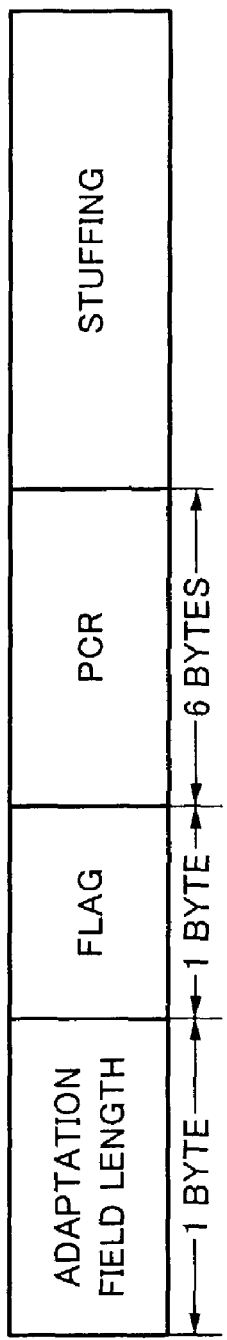
FIGS. 4A and 4B are schematic diagrams for explaining an adaptation field.
Figure 4B:
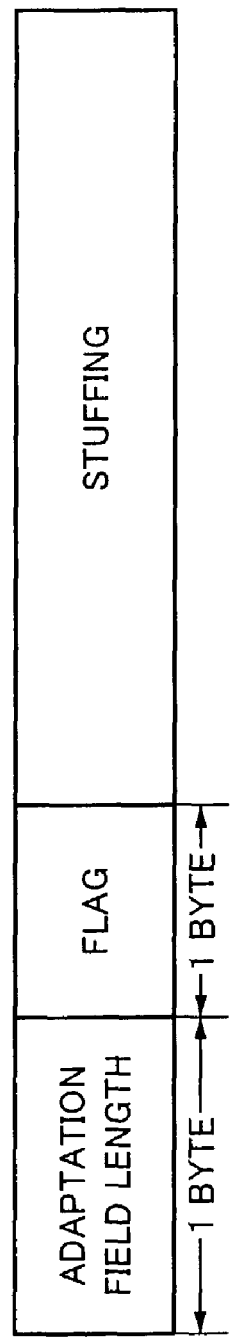

The adaptation field is used to transmit additional information of a discrete stream. As shown in FIG. 4A, the adaptation field is composed of an adaptation field length (adaptation_field_length) of one byte, five flags (PCR_flag, OPCR_flag, splicing_flag, transport_private_data_flag, adaptation_data_flag, and adaptation_field_extension _flag) of one byte, an optional field (optional_field), and a stuffing byte (stuffing byte). As shown in FIG. 4A, in a packet of a PCR (Program Clock Reference), a PCR of six bytes is disposed in the optional field.

Besides packets of video, audio, and data such as a subtitle, the transport stream contains packets of information described in tables of sections of the PSI and SI.

The PSI is information necessary for the system to select and receive a desired broadcast channel.

The PSI contains an NIT (Network Information Table), a PAT (Program Association Table), a PMT (Program Map Table), a CAT (Condition Access Table), and so forth.

In the NIT, the same content is multiplexed for all carriers. The NIT describes transmission characteristics (plane of polarization, carrier frequency, convolution rate, and so forth) of each carrier and a list of channels multiplexed on each carrier. The PID of a packet of the section of the NIT is (PIC=0x0010).

The PAT describes information of the content unique to each carrier. The PAT describes channel information of each carrier and the PID of the PMT which represents the content of each channel. The PID of a packet of the section of the PAT is (PID=0x0000).

The PMT (Program Map Table) describes components which compose each channel and the PID of an ECM packet necessary for descrambling. The PID of a packet of the section of the PMT is designated by the PAT.

The CAT (Condition Access Table) describes the PID of a packet of the EMM. The PID of a packet of the section of the CAT is (PID=0x0001).

The SI has an EIT (Event Information Table) and an SDT (Service Description Table).

The EIT describes a program broadcast schedule. The EIT is used for the EPG (Electronic program Guide) and timer recording. The PID of a packet of the EIT is (PID=0x0012).

The SDT describes information with respect to an organized channel such as an organized channel number, a channel name, a broadcast provider name, and so forth. The PID of a packet of the section of the SDT is (PID=0x0011).

Figure 5A:
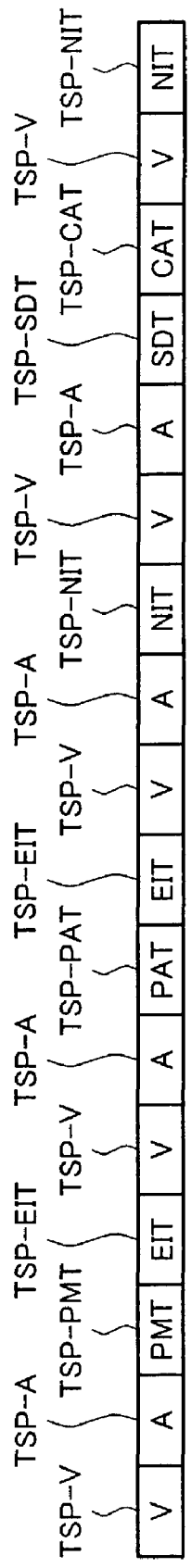
FIGS. 5A and 5B are schematic diagrams for explaining a partial transport stream.
Figure 5B:
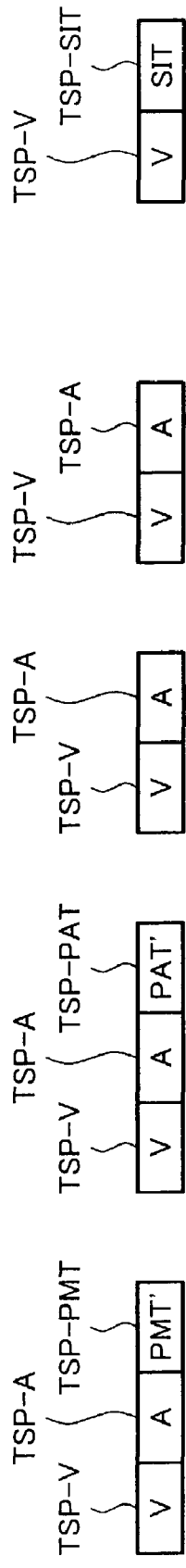

As shown in FIG. 5A, the received transport stream is composed of TS packets (TSP-V and TSP-A) of video and audio of a plurality of channels, TS packets (TSP-NIT, TSP-PAT, TSP-PMT, and TSP-CAT) of the PSI such as the NIT, the PAT, the PMT, and the CAT, and TS packets (TSP-EIT and TSP-SDT) of the SI such as the EIT and SDT. As shown in FIG. 5B, on the partial transport stream, other than TS packets which relate to the program reception are discarded and sections formed by the controller are inserted.

In other words, on the partial transport stream, for the PSI, only the TS packets (TSP-PAT and TSP-PMT) of the PAT and the PMT formed for the partial transport stream are output. In contrast, for the SI, only the SIT (TSP-SIT) formed by the controller as an SI which does not adversely affect the integrity of information is output. In addition, the DIT (Discontinuity Information Table) is transmitted so that when a channel is changed or the power is turned off, a problem about the integrity of information does not arise.

Figure 6:
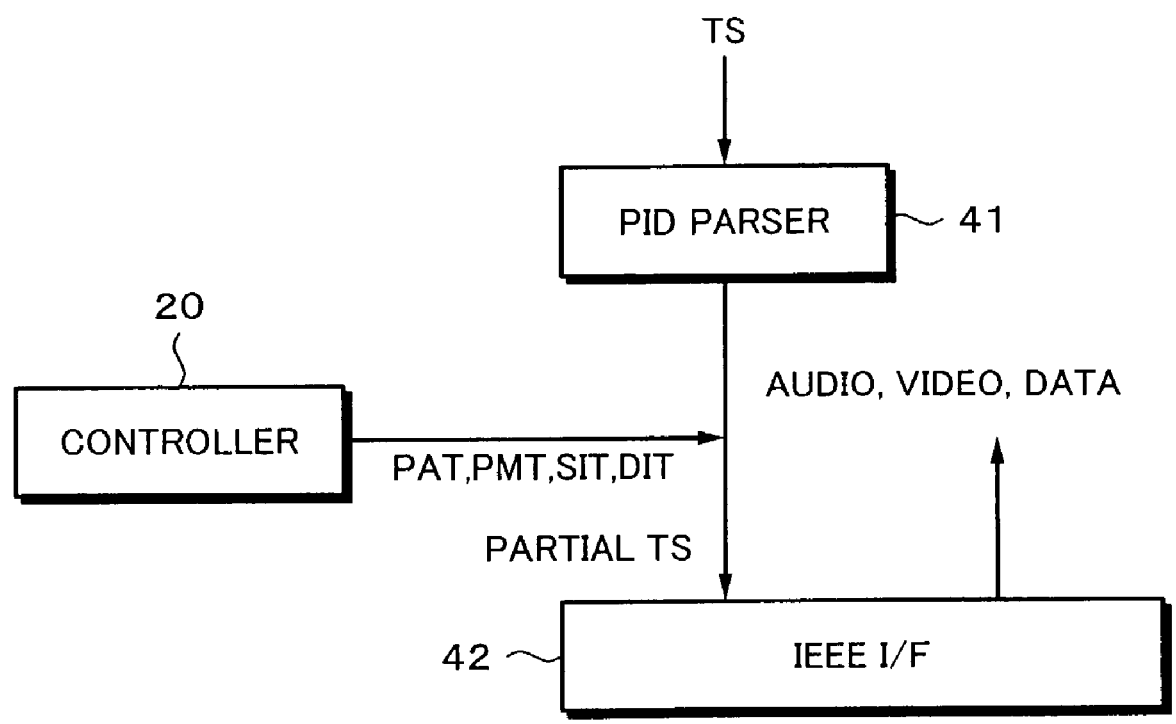
FIG. 6 is a block diagram for explaining the formation of a partial transport stream.

To form such a partial transport stream, as shown in FIG. 6, the PID parser 41 is disposed. PIDs of TS packets of audio, video, and data necessary for receiving the channel are set to the PID parser 41.

A received transport stream is supplied to the PID parser 41. The PID parser 41 passes only TS packets having the PIDs which have been set of the transport stream and discards the other TS packets. In addition, the PID parser 41 inserts the PAT, the PMT, the SIT, and the DIT formed by the controller into the transport stream. The resultant transport stream is sent as a partial transport stream to the IEEE 1394 interface 42.

However, information of sections of for example the EIT and SDT, which is not permitted to be transmitted, cannot be transmitted on a partial transport stream.

To solve such a problem, according to the embodiment of the present invention, information of sections of for example the PSI and the SI, which is not permitted to be transmitted on a partial transport stream, is transmitted as information of a private section.

Figure 7A:
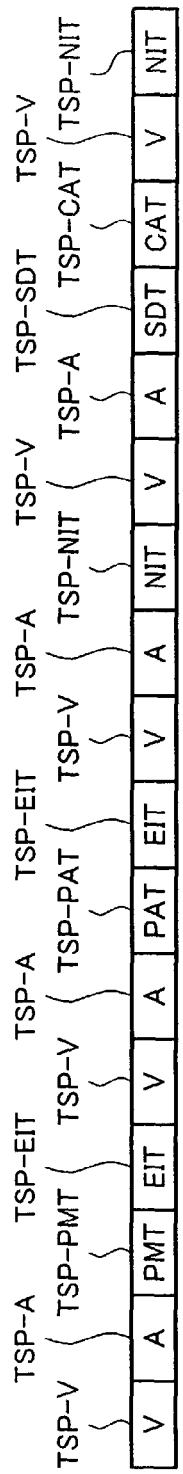
FIGS. 7A, 7B, and 7C are schematic diagrams for explaining a transfer of information of a section which is not permitted to be transmitted on a partial transport stream.
Figure 7B:
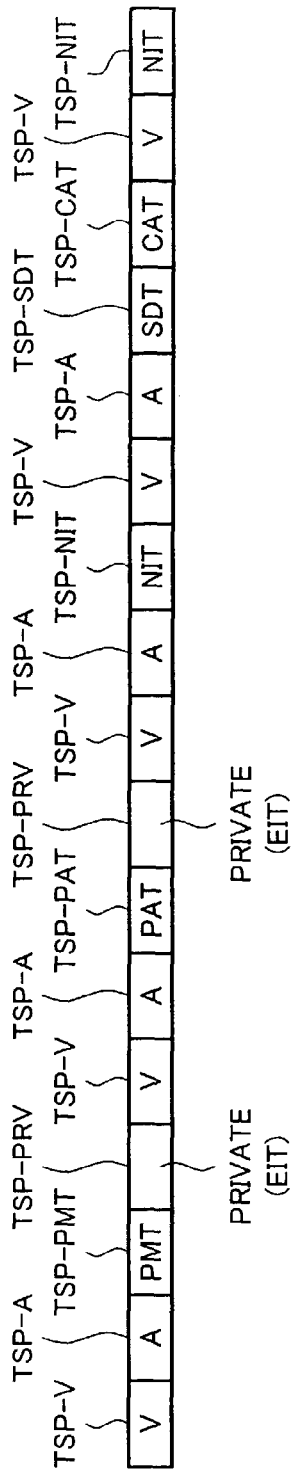

Now, it is supposed that the section of the EIT is sent through the IEEE 1394 interface 42. In this case, as shown in FIG. 7, a TS packet (TSP-EIT) of the section of the EIT of the transport stream (FIG. 7A) is transmitted as if it is a TS packet (TSP-PRV) of a private section as shown in FIG. 7B.

In other words, as was described above, the PID of a packet of the section of the EIT is (PID=0x0012). The packet of the section of the EIT is treated as a TS packet of a private section. The PID (PID=0x0012) is added to the list of TS packets which the PID parser 41 passes. Since the section of the EIT is treated as a private section, the description of the PMT is updated.

Figure 7C:
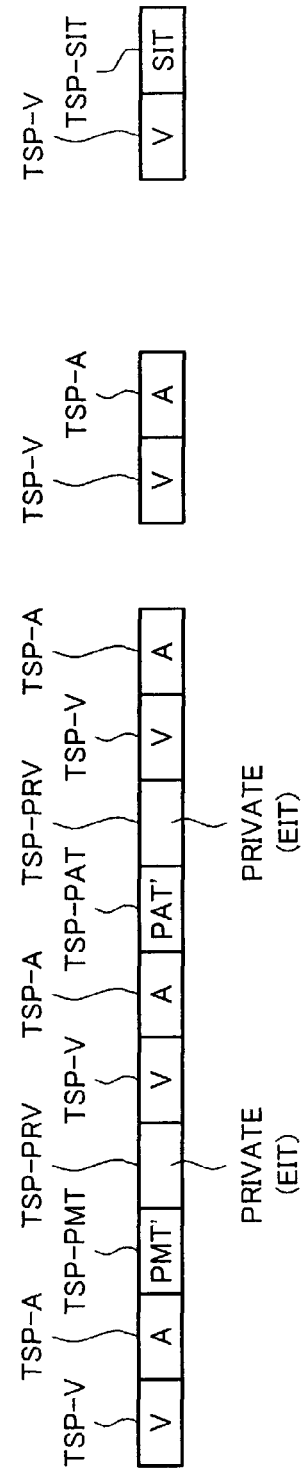

Thus, as shown in FIG. 7C, information of the section of the EIT is contained as a packet (TSP-PRV) of the private section in the partial transport stream. In FIG. 7C, PAT' and PMT' are formed corresponding to the content of the partial transport stream.

FIG. 8 shows the description of the PMT. The PMT is a table which describes PIDs of packets of video, audio, and data transmitted on the broadcast channel (program). When information of a section which is not permitted to be transmitted on a partial transport stream is contained as information of a private section in a partial transport stream, the description of the PMT is updated as follows.

The description of the PMT is composed of a portion which describes information of the broadcast channel and a portion which describes the type of each element of the broadcast channel and each PID.

At a first portion of the PMT, a table ID (table_id) of eight bits, a section syntax indicator (section_syntax_indicator) of one bit, a reserve (reserved) of two bits, a section length of 12 bits, a program number (program_number) of 16 bits, a reserve (reserved) of two bits, a version number (version_number) of five bits, a current/next indicator (current_next_indicator) of eight bits, a section number (section_number) of eight bits, a last section number (last_section_number) of eight bits, a reserve (reserved) of three bits, a PCR-PID (PCR PID) of 13 bits, a reserve (reserved) of four bits, and a program length (program_info_length) of 12 bits are described. They describe information of the broadcast channel. The program number (rogram_number) corresponds to the broadcast channel.

The next portion is looped. Each element of the channel is described for each of (video, audio, and data). The second loop is composed of a stream type (stream_type) of eight bits, a reserve (reserved) of three bits, an elementary PID (elementary_PID) of 13 bits, a reserve (reserved) of four bits, and an ES information length (ES_info_length) of 12 bits.

The elementary PID (elementary_PID) represents the PID of the element.

The stream type (stream_type) is defined as shown in FIG. 9. The stream type identifies the type of the stream such as video, audio, data, or the like.

At last, an error detection CRC (CRC_32) of 32 bits is described.

As shown in FIG. 9, in the stream type (stream_type), a private section (private_section) is assigned to the stream type (stream_type=0x05). When information of a section of for example the EIT, which is not permitted to be transmitted on a partial transport stream, is transmitted, (stream_type=0x05) which represents a private section is described as a stream type (stream_type) of the second loop of the PMT. As the elementary PID (elementary_PID), the PID (PID=Y) of the EIT transferred as a private section is described.

When the PMT describes information about the private section, a unit connected to the interface can interpret the private section with the PMT.

For example, a registration descriptor (registration_descriptor) as shown in FIG. 10 is inserted into the PMT. A registration descriptor is defined in the MPEG. A format identifier (format_identifier) of four letter ASCII (American Standard Code for Information Interchange) code can be assigned to each element of the PMT. In this example, a registration descriptor is described in a private section so as to represent the content of the private section. When information of the section of the EIT of a digital BS broadcast is transmitted as a private section, four letter ASCII code for example "BSEI" which represents that the content of the private section is information of the section of the EIT of the digital BS broadcast is described in the private section.

In the forgoing example, a private section of (stream_type=0x05) shown in FIG. 9 was used. Alternatively, a user private (User private) of (stream_type=0x80-0xFF) may be used.

Thus, although a stream of the section of the EIT is not permitted to be transmitted on a partial transport stream, when the section of the EIT is treated as a private section, the section of the EIT can be transferred on a partial transport stream.

Figure 11:
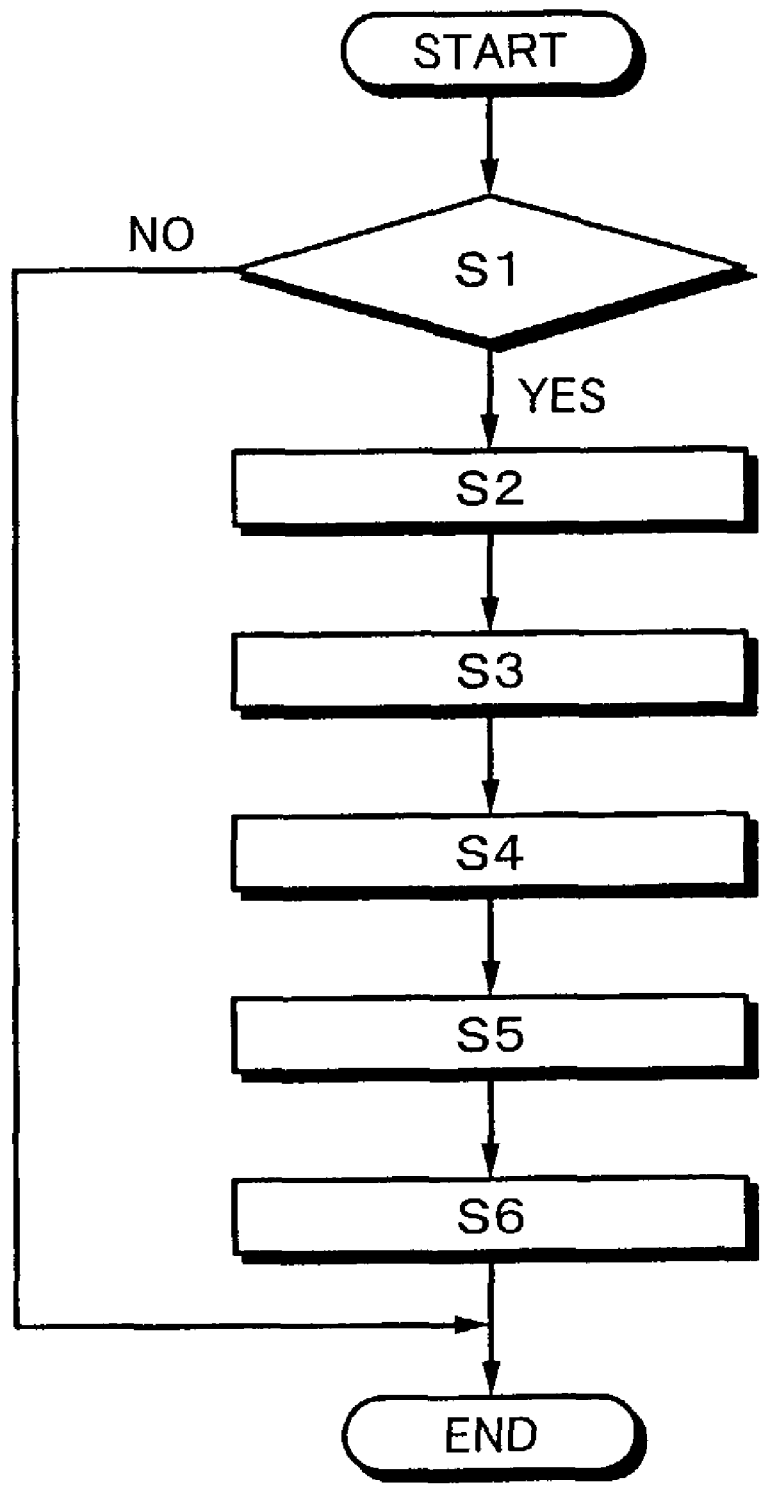
FIG. 11 is a flow chart for explaining a transfer of information of a section which is not permitted to be transmitted on a partial transport stream.

In FIG. 11, it is determined whether or not information of a section of for example the EIT or SDT which is not permitted to be transmitted on a partial transport stream is transmitted (at step S1). When information of a section which is not permitted to be transmitted on a partial transport stream is not transmitted, the process is terminated.

When information of a section which is not permitted to be transmitted on a partial transport stream is transmitted, a packet of the PMT is extracted (at step S2). (stream_tyep=0x05) which represents a private section as a stream type (stream_type) is added to the second loop of the PMT (at step S3). As the elementary PID (elementary_PID), the PID of the EIT is described (at step S4). A registration descriptor is inserted into description ( ) of the second loop. A unique identifier is described in the format identifier (format_identifier) (at step S5).

After the PMT has been rewritten, the PID of the private section is added to the list of the PID parser 41, which extracts the partial transport stream (at step S6).

When a stream of the section of the EIT is transmitted, at step S2, a TS packet of the PMT is extracted. At step S3, (stream_type=0x05), which represents a private section, as a stream type (stream_type) is added to the second loop of the PMT. At step S4, as the elementary PID (elementary_PID), the PID (PID=0X0012) of the EIT is described. At step S5, a registration descriptor is inserted into description ( ) of the second loop. An identifier "BSEI", which represents that the EIT of a digital BS broadcast is being transmitted, is described in the format identifier (format_identifier). At step S6, the PID of the private section is added to the list of the PID parser 41.

As a result, the information of the section of the EIT treated as information of a private section is contained in a partial transport stream which is output from the IEEE 1394 interface 42. Likewise, information of the section of the SDT can be transmitted as information of a private section.

Figure 12:
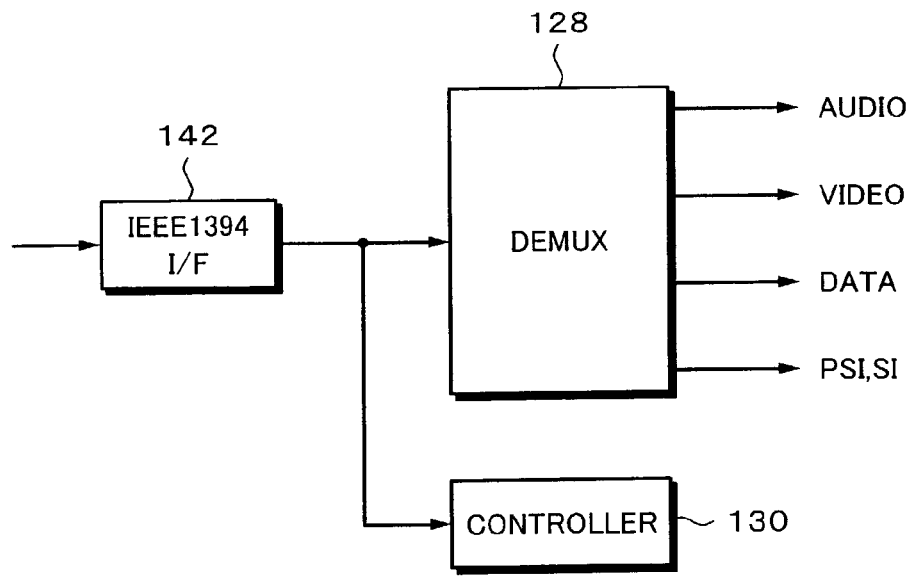
FIG. 12 is a block diagram for explaining a reception of a partial transport stream transferred through an interface.

When information of the section of the EIT and SDT transmitted as a stream of a private section is transferred to another unit and used thereon, as shown in FIG. 12, information of the private section is set as information of the EIT and SDT to a demultiplexer 128 of a reception side unit.

In other words, in FIG. 12, a stream of a section which is not permitted to be transmitted on a partial transport stream is contained as a private section in a stream and the resultant stream is transmitted to an IEEE 1394 interface 142 on the reception side unit. The stream is supplied from the IEEE 1394 interface 142 to the demultiplexer 128.

A controller 130 analyzes the table of the PMT extracted by the demultiplexer 128. Corresponding to the analyzed result, the controller 130 sets PIDs of packets the demultiplexer 128 separates.

The demultiplexer 128 separates packets of audio, video, data, and PSI and SI packet from the stream corresponding to the PIDs set by the controller 130. At that point, the controller 130 performs a process as shown in FIG. 13.

Figure 13:
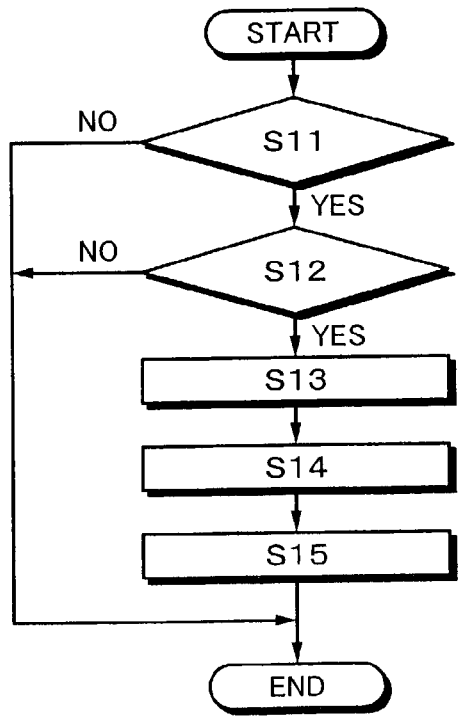
FIG. 13 is a flow chart for explaining a reception of a partial transport stream transferred through an interface.

In FIG. 13, it is determined whether or not (stream_type=0x05), which represents a private section, as the stream type (stream_type) of the second loop of the PMT has been described (at step S11). When the determined result represents that (stream_type=0x05), which represents a private section, as the stream type (stream_type) of the second loop of the PMT has been described, it is determined whether or not there is a registration descriptor (at step S12). When there is a registration descriptor, the format identifier (format_identifier) is analyzed. As a result, the stream of the private section is interpreted as information of a section represented by the format identifier. The PID of the stream of the private section is analyzed with the elementary PID (elementary_PID) of the PMT. The PID of the stream of the private section is set to the demultiplexer 128. The demultiplexer 128 extracts a packet of the private section.

For example, when a partial transport stream containing a stream of for example the EIT as a private section is transmitted and the PID is (PID=0x0012), at step S12, the determined result at step S11 represents that (stream_type=0x05), which represents a private section, has been described. The determined result at step S12 represents that there is a registration descriptor. The determined result at step S13 represents that the format identifier is for example "BSEI," which represents that the EIT of the digital BS broadcast is being transmitted. The PID (PID=Y) of the stream of the private section is analyzed with the elementary PID (elementary_PID) of the PMT. (PID=0x0012) is set to the demultiplexer 128. Thus, the demultiplexer 128 extracts a TS packet of the private section of (PID=0x0012). The packet of the private section is processed as the EIT of the digital BS broadcast.

As was described above, according to the embodiment of the present invention, information of sections of for example the EIT and SDT of the PSI and SI which is not permitted to be transmitted on a partial transport stream is transmitted as information of a private section. Thus, when necessary, a stream of a section which is not permitted to be transmitted on a partial transport stream can be transmitted. A unit which does not interpret a private section ignores a stream thereof. Thus, even if the PSI and SI which are not permitted to be transmitted on a partial transport stream is transmitted to such a unit, a problem about the integrity of information does not arise on the reception side.

In this example, the EIT and SDT are transmitted. When necessary, information of sections of for example the NIT and CAT can be transmitted as a private section. In addition, any data other than sections which are transmitted on a broadcast can be inserted as a private section into a partial transport stream and the resultant stream can be transmitted.

In the forgoing example, the case that a digital BS broadcast tuner is connected to a digital VCR and a personal computer through the IEEE 1394 interface was described. However, the present invention can be applied for the case that a set top box of a digital CATV (Cable Television) is connected to a digital VCR and a personal computer through the IEEE 1394 interface. In addition, according to the present invention, the interface is not limited to the IEEE 1394 interface. In other words, the present invention can be applied for other interfaces.

According to the present invention, when unnecessary TS packets are removed from a transport stream, necessary TS packets are inserted into the transport stream, and the resultant transport stream is output as a partial transport stream from an interface, any data (such as the EIT and SDT) which is not permitted to be transmitted on a partial transport stream is transmitted as a private section or a user private. As a result, information of the section of the EIT can be transmitted from a digital satellite broadcast tuner to a personal computer. An original program schedule list can be created on the personal computer.

Industrial Utilization

As was described above, the information transmitting apparatus, the method thereof, the information processing apparatus, the method thereof, and the information processing system are suitable for a satellite broadcast tuner which receives a signal corresponding to MPEG2-TS.

DESCRIPTION OF REFERENCE NUMERALS

1 DIGITAL SATELLITE BROADCAST TUNER
2 TELEVISION RECEIVER
3 VCR
4 PERSONAL COMPUTER
11 PARABOLA ANTENNA
22 TUNER CIRCUIT
23 DEMODULATING CIRCUIT
28 DEMULTIPLEXER
30 SWITCH CIRCUIT
31 VIDEO DECODER
32 AUDIO DECODER
41 PID PARSER
42 INTERFACE
S1 IS SECTION WHICH IS NOT PERMITTED TO BE TRANSMITTED ON PARTIAL TS IS TRANSMITTED?
S2 EXTRACT PMT
S3 STREAM TYPE←PRIVATE SECTION
S4 ELEMENTARY PID←PID OF PRIVATE SECTION
S5 DESCRIPTION OF FORMAT IDENTIFIER
S6 ADD PID OF PRIVATE SECTIION TO LIST OF PID PARSER
S11 DOES STREAM TYPE REPRESENT PRIVATE SECTION?
S12 IS THERE REGISTRATION DESCRIPTOR?
S13 ANALYZE FORMAT IDENTIFIER
S14 ANALYZE PID
S15 SET PID

The invention claimed is:

1. An information transmitting apparatus, comprising:
packet extracting means for extracting a packet related to content which is permitted to be transmitted on a partial transport stream from a transport stream and for discarding a non-permitted packet related to broadcast provider service information which is not permitted to be transmitted on the partial transport stream;
an interface for transmitting the partial transport stream which is output through the packet extracting means to another unit external to the information transmitting apparatus; and
means for adding one or more packets of data related to broadcast provider service information to the partial transport stream as a packet of one or more private sections and a packet of a private user, wherein the packet extracting means is configured to output packets of video, audio, and data and packets of sections of a PAT (Program Association Table), a PMT (Program Map Table), an SIT (Selection Information Table), and a DIT (Discontinuity Information Table) and to output the non-permitted packet as one of the packet of the private section and the packet of the private user when the non-permitted packet is to be output through the interface.

2. The information transmitting apparatus as set forth in claim 1,
wherein the transport stream is a stream corresponding to MPEG2-TS (Moving Picture Coding Experts Group 2-Transport Stream).

3. The information transmitting apparatus as set forth in claim 1,
wherein the transport stream is obtained from a received signal of a digital satellite broadcast.

4. The information transmitting apparatus as set forth in claim 1,
wherein the received signal is obtained from a received signal of a digital CATV (Cable Television) broadcast.

5. The information transmitting apparatus as set forth in claim 1,
wherein the interface is an IEEE (Institute of Electrical and Electronic Engineers) 1394 interface.

6. The information transmitting apparatus as set forth in claim 1,
wherein the non-permitted packet is a packet of a section of an EIT (Event Information Table).

7. The information transmitting apparatus as set forth in claim 1,
wherein the non-permitted packet is a packet of a section of an SDT (Service Description Table).

8. The information transmitting apparatus as set forth in claim 1,
wherein the non-permitted packet is a packet of any data.

9. The information transmitting apparatus as set forth in claim 1,
wherein the means for adding the non-permitted packet is configured to describe the private section or the private user as a stream type assignment of content of the PMT (Program Map Table) in which information of each element of a transport stream to be output is described and to describe a PID (Packet Identifier) of the private section or a PID of the private user as an elementary PID.

10. An information transmitting apparatus comprising:
packet extracting means for extracting a packet related to content which is permitted to be transmitted on a partial transport stream from a transport stream and for discarding a non-permitted packet related to broadcast provider service information which is not permitted to be transmitted on the partial transport stream;
an interface for transmitting the partial transport stream which is output through the packet extracting means to another unit external to the information transmitting apparatus; and
means for adding one or more packets of data related to broadcast provider service information to the partial transport stream as a packet of one or more private sections and a packet of a private user,
wherein the means for adding the non-permitted packet is configured to describe the private section or the private user as a stream type assignment of content of a PMT (Program Map Table) in which information of each element of a transport stream to be output is described and to describe a PID (Packet Identifier) of the private section or a PID of the private user as an elementary PID,
wherein the means for adding the non-permitted packet is further configured to describe an identifier for identifying a type of a packet to be output with a registration descriptor when the non-permitted packet is output as the packet of the private section or the packet of the private user through the interface.

11. An information transmitting method, comprising the steps of:
extracting a packet related to content which is permitted to be transmitted on a partial transport stream from a transport stream, outputting the extracted packet to an interface and discarding a non-permitted packet related to broadcast provider service information which is not permitted to be transmitted on the partial transport stream, wherein the output packets include packets of video, audio, and data and packets of sections of a PAT (Program Association Table), a PMT (Program Map Table), an SIT (Selection Information Table), and a DIT (Discontinuity Information Table) and the non-permitted packet is one of a packet of a private section and a packet of a private user when the non-permitted packet is to be output through the interface; and adding one or more packets of data related to broadcast provider service information to the partial transport stream as the packet of the private section or the packet of the private user; and transmitting the partial transport stream to a recording unit.

12. An information processing apparatus, comprising:

an interface for receiving a partial transport stream transmitted from a digital satellite broadcast tuner, the partial transport stream including packets of video, audio and data and packets of sections of a Program Associate Table, a Program Map Table, a Selection Information Table and a Discontinuity Information Table, the partial transport stream including a non-permitted packet as one of a packet of a private section and a packet of a private user when the non-permitted packet is received;

packet separating means for separating packets from the partial transport stream transmitted through the interface; and analyzing means for analyzing the content of the Program Map Table of the partial transport stream transmitted through the interface, information of each element of a transport stream being described in the Program Map Table, and interpreting the packet of the private section as a packet which is not permitted to be transmitted on the partial transport stream when the analyzed result represents that the partial transport stream contains the private section, said non-permitted packet being data related to broadcast provider service information, wherein when the information processing apparatus is a personal computer, processing the private section and when the information processing apparatus is a video recording device, ignoring the packet of the private section.

13. The information processing apparatus as set forth in claim 12, wherein the interface is an IEEE (Institute of Electrical and Electronic Engineers) 1394 interface.

14. The information processing apparatus as set forth in claim 12, wherein a packet which is not permitted to be transmitted on the partial transport stream is a packet of a section of an EIT (Event Information Table).

15. The information processing apparatus as set forth in claim 12, wherein a packet which is not permitted to be transmitted on the partial transport stream is a packet of a section of an SDT (Service Description Table).

16. The information processing apparatus as set forth in claim 12, wherein a packet which is not permitted to be transmitted on the partial transport stream is a packet of any data.

17. The information processing apparatus as set forth in claim 12, wherein the analyzing means is configured to analyze whether a stream type assignment of the content of a PMT describing information of each element of the transport stream is the private section or the private user.

18. The information processing apparatus as set forth in claim 17, wherein the analyzing means is configured to detect whether or not the content of the PMT describing information of each element of thee transport stream contains a registration descriptor and to identify the type of the packets corresponding to the description of the registration descriptor.

19. An information processing method, comprising the steps of:

receiving a partial transport stream transmitted from a digital satellite broadcast tuner through an interface, the partial transport stream including packets of video, audio and data and packets of sections of a Program Associate Table, a Program Map Table, a Selection Information Table and a Discontinuity Information Table, the partial transport stream including a non-permitted packet as one of a packet of a private section and a packet of a private user when the non-permitted packet is received;

separating packets from the partial transport stream transmitted through the interface; and analyzing the content of the Program Map Table of the partial transport stream transmitted through the interface, information of each element of a transport stream being described in the Program Map Table, and interpreting the packet of the private section as a packet which is not permitted to be transmitted on the partial transport stream when the analyzed result represents that the partial transport stream contains the private section or the private user, said non-permitted packet being data related to broadcast provider service information, wherein when the information processing method is performed by a personal computer, processing the private section and when the information processing method is performed by a video recording device, ignoring the packet of the private section.

20. An information processing system, comprising:

an information transmitting apparatus for extracting a packet which is permitted to be transmitted on a partial transport stream from a transport stream and outputting the extracted packet through an interface wherein the information transmitting apparatus is configured to output packets of video, audio, and data and packets of sections of a Program Association Table, a Program Map Table, a Selection Information Table, and a Discontinuity Information Table and to output a non-permitted packet as one of a packet of a private section and a packet of a private user when the non-permitted packet is to be output through the interface; and an information processing apparatus for receiving a partial transport stream transmitted through the interface, separating packets from the partial transport stream, and processing the packets, wherein the information processing apparatus includes at least a personal computer and a digital video recording apparatus, wherein when a packet which is not permitted to be transmitted on the partial transport stream is transmitted from the information transmitting apparatus to the information processing apparatus through the interface, the information transmitting apparatus is configured to transmit the packet which is not permitted to be transmitted on the partial transport stream as the packet of the private section or the packet of the private user, wherein the packet which is not permitted to be transmitted being data related to broadcast provider service information.

21. The information processing system as set forth in claim 20, wherein a packet which is not permitted to be transmitted on the partial transport stream is a packet of a section of an EIT (Event Information Table).

22. The information processing system as set forth in claim 20, wherein a packet which is not permitted to be transmitted on the partial transport stream is a packet of a section of an SDT (Service Description Table).

23. The information processing system as set forth in claim 20,
wherein a packet which is not permitted to be transmitted on the partial transport stream is a packet of any data.

* * * * *